(12) United States Patent
Ito (10) Patent No.: US 9,958,333 B2
(45) Date of Patent: May 1, 2018

(54) SENSOR TAG AND MANUFACTURING METHOD FOR SENSOR TAG (71) Applicant: Murata Manufacturing Co., Ltd., Kyoto (JP)

(72) Inventor: Yoshihiro Ito, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 499 days.

(21) Appl. No.: 14/823,594

(22) Filed: Aug. 11, 2015

(65) Prior Publication Data

US 2015/0349400 A1 Dec. 3, 2015

Related U.S. Application Data (63) Continuation of application No. PCT/JP2013/084011, filed on Dec. 19, 2013.

(30) Foreign Application Priority Data

Feb. 22, 2013 (JP) .................................. 2013-032782

(51) Int. Cl.
*G08B 13/14* (2006.01)
*G01K 1/02* (2006.01)
(Continued)

(52) U.S. Cl.
CPC ............... *G01K 1/024* (2013.01); *G01K 7/32* (2013.01); *G06K 19/0672* (2013.01);
(Continued)

(58) Field of Classification Search
CPC ........... G06K 7/0008; G06K 19/07758; G06K 19/0717
(Continued)

(56) References Cited

U.S. PATENT DOCUMENTS 6,028,503 A * 2/2000 Preishuberpflugl .. G06K 7/0008
340/10.4
6,307,517 B1 * 10/2001 Lee ...................... G06K 7/0008
340/10.1
(Continued)

FOREIGN PATENT DOCUMENTS

JP S61-181925 A 8/1986
JP 2003-270051 A 9/2003
(Continued)

OTHER PUBLICATIONS

International Search Report issued in Application No. PCT/JP2013/084011 dated Mar. 25, 2014.
(Continued)

*Primary Examiner* — Hoi Lau
(74) *Attorney, Agent, or Firm* — Pearne and Gordon LLP (57) ABSTRACT A sensor tag (10) includes a crystal vibrator (110) and an antenna (102). The antenna (102) is composed of a radiating conductor (121) and connection conductors (122). A crystal vibrator (110) is mounted on land conductors (120) provided at an end portion of the connection conductors (122) on the opposite side to the antenna (121). The antenna (102) is formed in a shape such that an amount of shift ($\Delta F$) of a radiation frequency of the sensor tag (10) falls within an acceptable range in accordance with a resonant frequency (Fxs) and an equivalent inductance (Lxs) of the crystal vibrator (110) and a self-resonant frequency (Fant) and an equivalent inductance (Lant) of the antenna (102).

20 Claims, 6 Drawing Sheets (51) Int. Cl.
  *G01K 7/32* (2006.01)
  *H01Q 7/00* (2006.01)
  *G06K 19/07* (2006.01)
  *H01Q 1/08* (2006.01)
  *H01Q 1/22* (2006.01)
  *H04Q 9/00* (2006.01)
  *G06K 19/067* (2006.01)

(52) U.S. Cl.
  CPC ......... *G06K 19/0717* (2013.01); *H01Q 1/085* (2013.01); *H01Q 1/2225* (2013.01); *H01Q 7/00* (2013.01); *H04Q 9/00* (2013.01); *H04Q 2209/47* (2013.01); *Y10T 29/4902* (2015.01)

(58) Field of Classification Search
  USPC ............. 340/572.1, 572.5, 572.7, 10.4, 10.1; 343/702, 741, 870
  See application file for complete search history.

(56) References Cited

U.S. PATENT DOCUMENTS

| | | | |
|---|---|---|---|
| 9,607,258 B2* | 3/2017 | Murayama | G06K 19/07758 |
| 2005/0141591 A1 | 6/2005 | Sakano | |
| 2006/0214857 A1* | 9/2006 | Ollikainen | H01Q 1/243 343/702 |
| 2008/0012580 A1 | 1/2008 | Funo | |
| 2009/0204170 A1* | 8/2009 | Hastings | A61N 1/0565 607/33 |
| 2009/0322634 A1* | 12/2009 | Yun | H01Q 1/2208 343/741 |
| 2011/0217205 A1 | 9/2011 | Peeters | |
| 2011/0307034 A1* | 12/2011 | Hastings | A61B 18/1206 607/61 |
| 2014/0319230 A1* | 10/2014 | Murayama | H01Q 1/2283 235/492 |
| 2015/0349400 A1* | 12/2015 | Ito | G06K 19/0717 343/870 |
| 2017/0147917 A1* | 5/2017 | Murayama | G06K 19/07758 |

FOREIGN PATENT DOCUMENTS

| | | |
|---|---|---|
| JP | 2007-519484 A | 7/2007 |
| JP | 2007-333484 A | 12/2007 |
| JP | 2012-007963 A | 1/2012 |
| JP | 2012-189336 A | 10/2012 |

OTHER PUBLICATIONS

Translation of Written Opinion issued in Application No. PCT/JP2013/084011 dated Mar. 25, 2014.

Japanese Office Action issued in Patent Application No. 2015-501293 dated Nov. 8, 2016.

* cited by examiner

SENSOR TAG AND MANUFACTURING METHOD FOR SENSOR TAG

FIELD OF THE DISCLOSURE

The present disclosure relates to a sensor tag including a resonator having a resonant frequency that depends on and changes with a physical quantity such as temperature or magnetic field strength and an antenna connected to the resonator.

DESCRIPTION OF THE RELATED ART

In the related art, systems have been proposed for measuring physical quantities such as temperature wirelessly. For example, a system described in Patent Document 1 includes a sensor tag that measures a temperature and wirelessly transmits the measurement data and a measurement device that receives the measurement data from the sensor tag and executes the certain measurement processing. The sensor tag includes a sensor element that detects a temperature, an RFID that transforms a measurement result of the sensor element into data and an antenna that transmits the measurement data.

A resonator such as a crystal vibrator may be used as such a sensor element. Since the resonant frequency of a resonator depends on the temperature, when an excitation signal is supplied from a measurement device, a resonance signal is generated that corresponds to the temperature sensed by the resonator. The resonance signal is received by the measurement device and frequency analysis is performed and in this way the temperature can be measured.

Patent Document 1: Japanese Unexamined Patent Application Publication (Translation of PCT Application) No. 2007-519484

BRIEF SUMMARY OF THE DISCLOSURE

However, the frequency of a signal received by the measurement device, that is, the frequency of a signal radiated from the sensor tag is affected by the impedance of the antenna.

For example, in the case where the shape of an antenna changes with the mode of use, since the impedance of the antenna changes, the frequency of a signal radiated from the sensor tag changes even though the resonant frequency of the resonator does not change. When such a change in frequency occurs, since the relationship between resonant frequency and temperature is set in advance in the measurement device, a temperature measurement error occurs.

This phenomenon similarly occurs in systems in which a physical quantity other than temperature is sensed using a resonator and the physical quantity is measured from the resonant frequency of the resonator.

Therefore, an object of the present disclosure is to provide a sensor tag in which there is little variation in the frequency of a radiated signal and a manufacturing method for the sensor tag.

Solution to Problem

A sensor tag of the present disclosure includes a resonator that resonates at a resonant frequency corresponding to a sensed physical quantity and an antenna that radiates a signal generated by the resonance of the resonator to the outside. The antenna is formed such that a resonant frequency ratio falls within a certain range based on an inductance ratio. The resonant frequency ratio is a ratio between the resonant frequency of the resonator and a self-resonant frequency of the antenna. The inductance ratio is a ratio between an equivalent inductance of the resonator and an equivalent inductance of the antenna.

With this configuration, the shape of the antenna is determined so as to be within a range in which the resonant frequency ratio is unlikely to change even when the equivalent inductance of the antenna changes. Therefore, the range of variation of the frequency of a radiation signal of the sensor tag is small even when the shape of the antenna changes.

Furthermore, it is preferable that the sensor tag of the present disclosure have any of the following configurations. The resonant frequency ratio is expressed by a function of the inductance ratio. The antenna is formed such that the resonant frequency ratio is equal to or less than a value obtained by inputting the inductance ratio into the function. The antenna is formed such that the resonant frequency ratio is equal to or more than a value obtained by inputting the inductance ratio into the function.

With these configurations, specific criteria for determining the shape of the antenna are illustrated.

In addition, in the sensor tag of the present disclosure, it is preferable that the function be expressed by a quadratic function of the inductance ratio.

With this configuration, a specific criterion for determining the shape of the antenna is illustrated.

In addition, in the sensor tag of the present disclosure, it is preferable that a coefficient of the function be determined on the basis of an acceptable range of frequency shifting.

With this configuration, when a permitted range of frequency shifting is set, an antenna shape corresponding to this permitted range can be realized.

Furthermore, it is preferable that the antenna of the sensor tag of the present disclosure include a radiating conductor and a connection conductor connecting the radiating conductor and the resonator, and that a shape of the antenna be determined on the basis of a shape of the radiating conductor or the connection conductor.

With this configuration, a specific mode for determining the shape of the antenna is illustrated.

Furthermore, it is preferable that the resonator of the sensor tag of the present disclosure be a crystal vibrator.

With this configuration, a specific example of the resonator is illustrated.

The present disclosure relates to manufacturing method for a sensor tag including a resonator that resonates at a resonant frequency corresponding to a sensed physical quantity and an antenna that radiates a signal generated by resonance of the resonator to the outside. The manufacturing method for the sensor tag of the present disclosure includes a step of preparing a plurality of antennas, a step of measuring a self-resonant frequency and an equivalent inductance of each of the antennas, a step of measuring a resonant frequency and an equivalent inductance of a resonator, and a step of connecting one of the antennas to the crystal vibrator such that a resonant frequency ratio between the resonant frequency of the resonator and the self-resonant frequency of the antenna falls within a certain range based on an inductance ratio between the equivalent inductance of the resonator and the equivalent inductance of the antenna.

With this manufacturing method, an antenna can be easily manufactured that is able to make a range of the variation of the frequency of a radiation signal of a sensor tag small even when the shape of the antenna changes.

According to the present disclosure, the effect of the variations in the characteristics of a resonator can be suppressed and a physical quantity that is a measurement target can be measured accurately.

DETAILED DESCRIPTION OF THE DISCLOSURE

Figure 1:
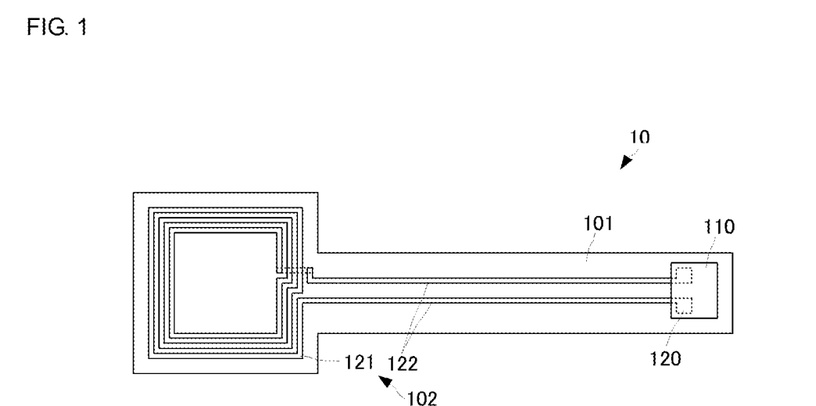
FIG. 1 is a plan view illustrating the configuration of a sensor tag according to an embodiment of the present disclosure.

A sensor tag according to a first embodiment of the present disclosure will be described with reference to the drawings. FIG. 1 is a plan view illustrating the configuration of the sensor tag according to the embodiment of the present disclosure. Hereafter, a sensor tag and a measurement system that perform the temperature measurement will be described as an example, but the present disclosure can also be applied to sensor tags that measure another physical quantity (such as magnetic field strength) on which the resonant frequency of a resonator has a dependence. In addition, a crystal vibrator is described hereafter as an example of a resonator, but so long as the resonant frequency of the resonator changes with a sensed physical quantity, the resonator may be another type of resonator.

A sensor tag 10 includes a flexible substrate 101, an antenna 102 and a crystal vibrator 110.

The flexible substrate 101 is composed of a material having flexibility and an insulating property. The flexible substrate 101 corresponds to a "base member" of the present disclosure. For example, a sheet of paper or a resin such as PET, PEN, PI or PE having a thickness on the order of 0.1 mm is employed as the flexible substrate 101. The flexible substrate 101 has a shape formed in an integrated manner composed of a first part having a substantially square shape when viewed in a planar view and a second part having an elongated shape when viewed in a planar view that extends in a direction orthogonal to an edge of the square-shaped portion.

The antenna 102 is formed on a surface of the flexible substrate 101. The antenna 102 is composed of a radiating conductor 121 and connection conductors 122.

The radiating conductor 121 and the connection conductors 122 are line-shaped conductors. The radiating conductor 121 is formed in a spiral shape and is formed on the first part of the flexible substrate 101.

The radiating conductor 121 is formed in a shape corresponding to a frequency at which communication will be performed through electromagnetic field coupling between the sensor tag 10 and an external temperature measurement device (not illustrated). In this embodiment, the radiating conductor 121 is formed in a spiral shape, but may instead have the shape of a dipole antenna or a patch antenna.

The connection conductors 122 are composed of two long parallel conductors and are formed on the second part of the flexible substrate 101. One end of each of the long connection conductors 122 is connected to the radiating conductor 121. Land conductors 120 are formed at the other ends of the long connection conductors 122.

The crystal vibrator 110 corresponds to a "resonator" of the present disclosure and is mounted on the land conductors 120.

An insulating protective film (not illustrated) may be formed over the entirety of the surface of the flexible substrate 101 on which the antenna 102 and the crystal vibrator 110 are mounted.

The crystal vibrator 110 is excited by an excitation signal received by the antenna 102 and resonates at a resonant frequency corresponding to a sensed temperature. At this time, the resonant frequency is not determined by the crystal vibrator 110 alone and is also affected by the antenna 102.

Figure 2:
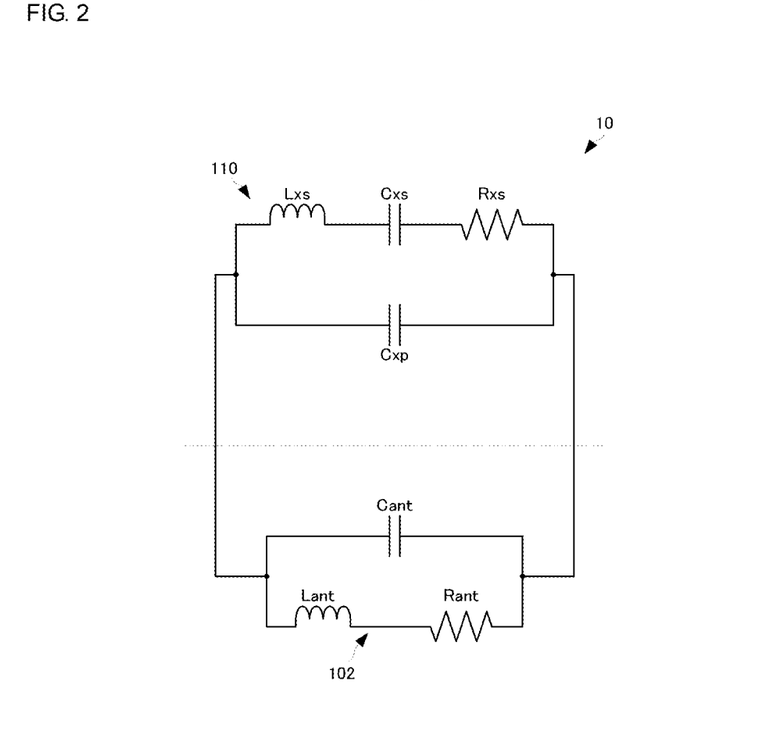
FIG. 2 is an equivalent circuit diagram of the sensor tag.

An equivalent circuit of the sensor tag 10 is as illustrated in FIG. 2. FIG. 2 is an equivalent circuit diagram of the sensor tag according to the first embodiment of the present disclosure. In terms of an equivalent circuit, the sensor tag 10 is formed of a closed loop made up of an impedance circuit of the crystal vibrator 110 and an impedance circuit of the antenna 102.

The crystal vibrator 110 includes an equivalent inductance Lxs, equivalent capacitances Cxs and Cxp, and an equivalent resistance Rxs. The equivalent inductance Lxs, the equivalent capacitance Cxs and the equivalent resistance Rxs are connected in series with each other. The equivalent capacitance Cxp is connected in parallel with this series circuit. The crystal vibrator 110 has a resonant frequency Fxs determined by series resonance of the equivalent inductance Lxs and the equivalent capacitance Cxs.

[Math 1]

$$Fxs = \frac{1}{2\pi\sqrt{Lxs \cdot Cxs}} \quad \text{(Equation 1)}$$

The antenna 102 includes an equivalent inductance Lant, an equivalent capacitance Cant and an equivalent resistance Rant. The equivalent inductance Lant and the equivalent resistance Rant are connected in series with each other and the equivalent capacitance Cant is connected in parallel with the series circuit formed of the equivalent inductance Lant and the equivalent resistance Rant. Therefore, the antenna 102 has a self-resonant frequency fant determined by parallel resonance of the equivalent inductance Lant and the equivalent capacitance Cant.

[Math 2]

$$Fant = \frac{1}{2\pi\sqrt{Lant \cdot Cant}} \quad \text{(Equation 2)}$$

The crystal vibrator 110 and the antenna 102 including the equivalent circuits having respective resonances are connected in a closed loop, and as a result a resonant frequency of the sensor tag 10, that is, a radiation frequency of a signal radiated by the sensor tag 10 is a frequency that is affected by these equivalent circuits. Therefore, even though the resonant frequency Fxs of the crystal vibrator 110 is constant, a radiation frequency of the sensor tag 10 changes when the resonant frequency Fant of the antenna 102 changes. In other words, when an equivalent circuit constant of the antenna 102 (equivalent inductance Lant or equivalent capacitance Cant) changes, the radiation frequency of the sensor tag 10 also changes.

Here, since the antenna 102 is formed on the surface of the flexible substrate 101, when the flexible substrate 101 is deformed, the shape of the antenna 102 also changes and as a result an equivalent circuit constant of the antenna 102 also changes.

Therefore, the shape of the antenna 102 of the sensor tag 10 of this embodiment is determined in the following way such that even if a change occurs in an equivalent circuit constant of the antenna 102 due to for example the deformation of the antenna 102 in this way, the radiation frequency of the sensor tag 10 negligibly changes.

Figure 3:
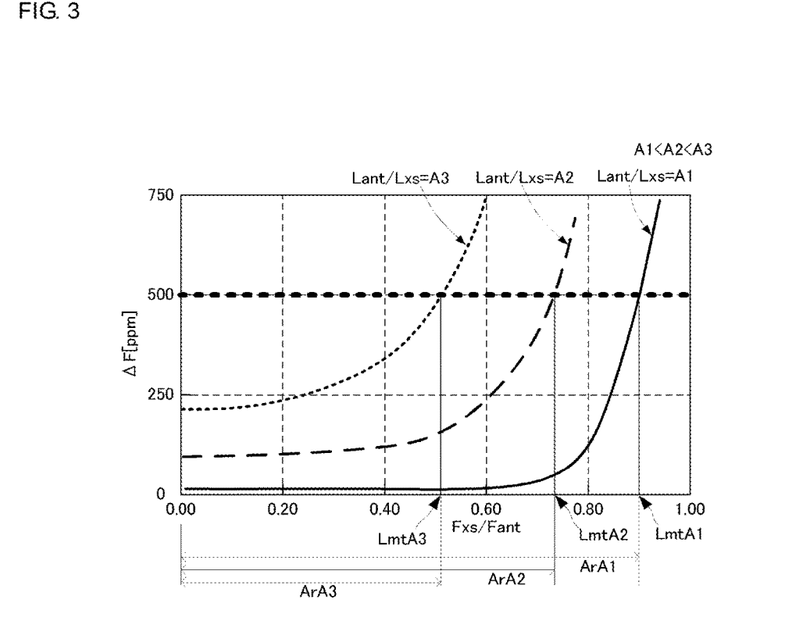
FIG. 3 is a graph illustrating a concept of determining an antenna according to a first embodiment of the present disclosure.
Figure 4:
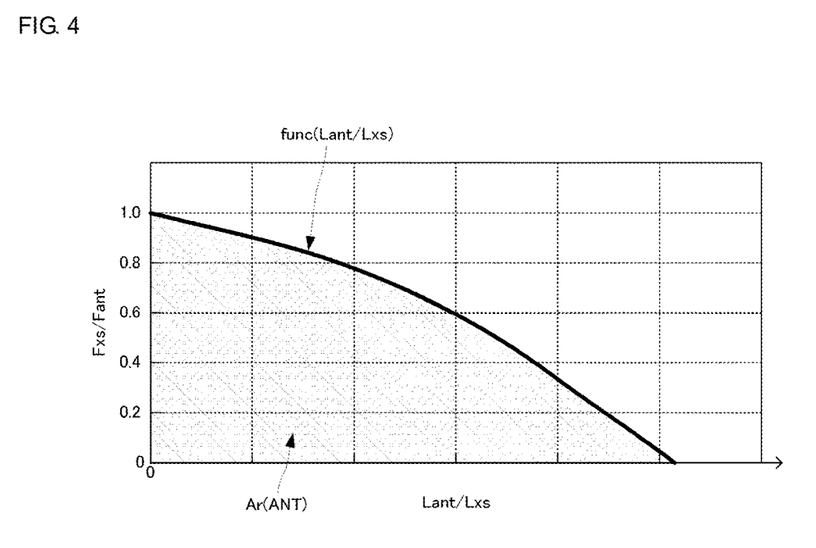
FIG. 4 is a graph illustrating a concept of determining an antenna according to the first embodiment of the present disclosure.

FIGS. 3 and 4 are graphs illustrating a concept of determining an antenna according to the first embodiment of the present disclosure. FIG. 3 is a graph illustrating the results of a simulation of what effect a resonant frequency ratio, which is a ratio between the resonant frequency Fxs of the crystal vibrator and the self-resonant frequency Fant of the antenna, and an inductance ratio, which is a ratio of the equivalent inductance Lxs of the crystal vibrator and the equivalent inductance Lant of the antenna, have on a radiation frequency F. In FIG. 3, the horizontal axis represents the resonant frequency ratio and the vertical axis represents an amount of shift ΔF of the radiation frequency F. In addition, the characteristic curves in FIG. 3 each represent the case of a different inductance ratio. FIG. 4 is a graph illustrating the relationship between the resonant frequency ratio and the inductance ratio. In FIG. 4, the horizontal axis represents the inductance ratio and the vertical axis represents the resonant frequency ratio.

The resonant frequency ratio in FIGS. 3 and 4 is a ratio obtained by taking the resonant frequency Fxs of the crystal vibrator 110 by itself as the numerator and the resonant frequency Fant of the antenna 102 by itself as the denominator. The inductance ratio in FIGS. 3 and 4 is a ratio obtained by taking the equivalent inductance Lant of the antenna 102 as the numerator and the equivalent inductance Lxs of the crystal vibrator 110 as the denominator. In FIGS. 3 and 4, Lant/Lxs is actually (Lant/Lxs)×10⁶.

The amount of shift ΔF in FIG. 3 is expressed by ΔF=F1c−F1t, where F1t is the radiation frequency in a normal state where the antenna is not bent and F1c is the radiation frequency in a state where the antenna is bent. In this simulation, the resonant frequency Fxs and the equivalent inductance Lxs of the crystal vibrator 110 are those for a case where the simulation is performed at a temperature of 38.75° C. This temperature may be set on the basis of a temperature range to be measured by the sensor tag 10 and may be set to a temperature in the center of this range for example.

As illustrated in FIG. 3, the amount of shift ΔF increases as a resonant frequency ratio frF (=Fxs/Fant) approaches 1.0 when an inductance ratio frL (=Lant/Lxs) is fixed. That is, the closer the resonant frequency Fxs of the crystal vibrator 110 and the self-resonant frequency Fant of the antenna come to having the same value, the more liable the amount of shift ΔF is to increase.

In addition, when the resonant frequency ratio frF is fixed, the larger the inductance ratio frL becomes, the larger the amount of shift ΔF becomes. That is, as the equivalent inductance Lant of the antenna 102 approaches the equivalent inductance Lxs of the crystal vibrator 110, the more liable the amount of shift ΔF is to increase. As illustrated in FIG. 3, this phenomenon occurs with the same trend regardless of the resonant frequency ratio.

Therefore, as the inductance ratio frL becomes larger, an acceptable range Ar of the resonant frequency ratio equal to or less than a certain amount of shift ΔF becomes narrower. For example, as illustrated in FIG. 3, an acceptable value of ΔF is 500 ppm, the inductance ratio frL is set to three values A1, A2 and A3, and A1<A2<A3. ArA1>ArA2>ArA3, where ArA1, ArA2 and ArA3 denote acceptable ranges of the resonant frequency ratio frF in the respective cases.

If we make the relationship between the resonant frequency ratio frF and the inductance ratio frL determining the acceptable range into a function, the following expression is obtained under conditions of 0<frF<1 and frL<1.

$$frF = 1 - k1 \cdot frL^2 - k2 \cdot frL \quad \text{(Equation 3)}$$

Representing this equation as a graph, the thick line in FIG. 4 is obtained.

Points lying along the function represent cases where the amount of shift ΔF has a threshold acceptable value. Therefore, if the resonant frequency ratio frF is fixed, the amount of shift ΔF is less than the threshold acceptable value when the inductance ratio is smaller than the inductance ratio frL calculated from (Equation 3). In addition, if the inductance ratio frL is fixed, the amount of shift ΔF is less than the threshold acceptable value when the resonant frequency ratio is smaller than the resonant frequency ratio frF calculated from (Equation 3). That is, the resonant frequency ratio frF and the inductance ratio frL may be simply determined so as to be at a position on the origin side of the function of (Equation 3) in the graph of FIG. 4. The shape of the antenna 102 may be determined using the determined resonant frequency ratio frF and the inductance ratio frL. The shape of the antenna 102 may be determined using the shape of the radiating conductor 121, the shape of the connection conductors 122 and the position at which the crystal vibrator 110 is connected to the connection conductors 122 and so forth. The shape of the radiating conductor 121 is determined by the number of turns, the central opening width (diameter), the conductor width and the conductor spacing. The shape of the connection conductors 122 is determined by the width and the spacing of the long conductors.

By determining the shape of the antenna 102 in this way, the radiation frequency F of the sensor tag 10 can be kept within a preset range of acceptable frequencies even when the equivalent inductance of the antenna 102 changes due to for example the deformation of the antenna 102.

It is possible to design the shape of the antenna 102 to correspond to a threshold acceptable value of the amount of shift ΔF by changing the coefficients of (Equation 3).

Figure 5:
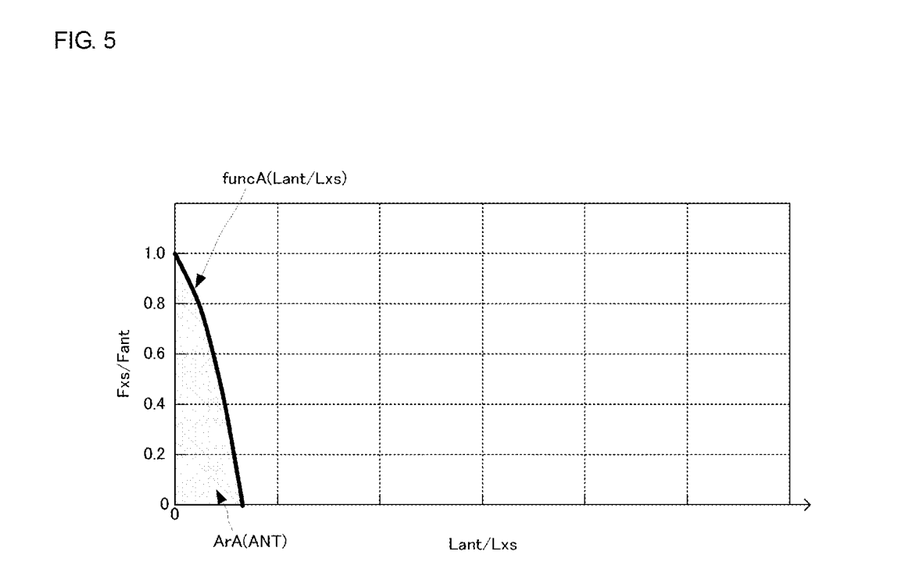
FIG. 5 is a graph illustrating a relationship between a resonant frequency ratio and an inductance ratio in which a threshold acceptable value has been changed.

FIG. 5 is a graph illustrating the relationship between the resonant frequency ratio and the inductance ratio in which a threshold acceptable value has been changed. The acceptable range of inductances of the antenna 102 in the case illustrated in FIG. 5 is smaller than in the case illustrated in FIG. 3. By forming the antenna 102 so that this acceptable range is satisfied even if the threshold acceptable value of the amount of shift ΔF changes in this way, the radiation frequency F of the sensor tag 10 can be kept within an acceptable frequency range even when the antenna 102 is deformed.

Here, a number of specific setting examples will be described. The following setting examples illustrate a case in which a Ys cut crystal vibrator 110 has a resonant frequency of 26 MHz. The Ys cut crystal is useful since it is possible to perform a high-resolution temperature measurement with a characteristic of 100 ppm/° C. In addition, the inductance of the antenna 102 is thought to change by −20% when the antenna 102 is bent.

(A) When the acceptable temperature error range is ±2.5° C., the acceptable range of the amount of shift ΔF is ±250 ppm. In this case, the coefficients of (Equation 3) may be set as follows.

$k1 \approx 3.0 \times 10^{-7}$ $k2 \approx 5.0 \times 10^{-4}$ (B) When the acceptable temperature error range is ±1.5° C., the acceptable range of the amount of shift ΔF is ±150 ppm. In this case, the coefficients of (Equation 3) may be set as follows.

$k1 \approx 8.0 \times 10^{-7}$ $k2 \approx 4.0 \times 10^{-4}$ (C) When the acceptable temperature error range is ±1.0° C., the acceptable range of the amount of shift ΔF is ±100 ppm. In this case, the coefficients of (Equation 3) may be set as follows.

$k1 \approx 1.0 \times 10^{-6}$ $k2 \approx 5.0 \times 10^{-4}$ (D) When the acceptable temperature error range is ±0.5° C., the acceptable range of the amount of shift ΔF is ±50 ppm. In this case, the coefficients of (Equation 3) may be set as follows.

$k1 \approx 2.5 \times 10^{-6}$ $k2 \approx 5.5 \times 10^{-4}$ (E) When the acceptable temperature error range is ±0.2° C., the acceptable range of the amount of shift ΔF is ±20 ppm. In this case, the coefficients of (Equation 3) may be set as follows.

$k1 \approx 5.0 \times 10^{-6}$ $k2 \approx 2.0 \times 10^{-3}$

Figure 6:
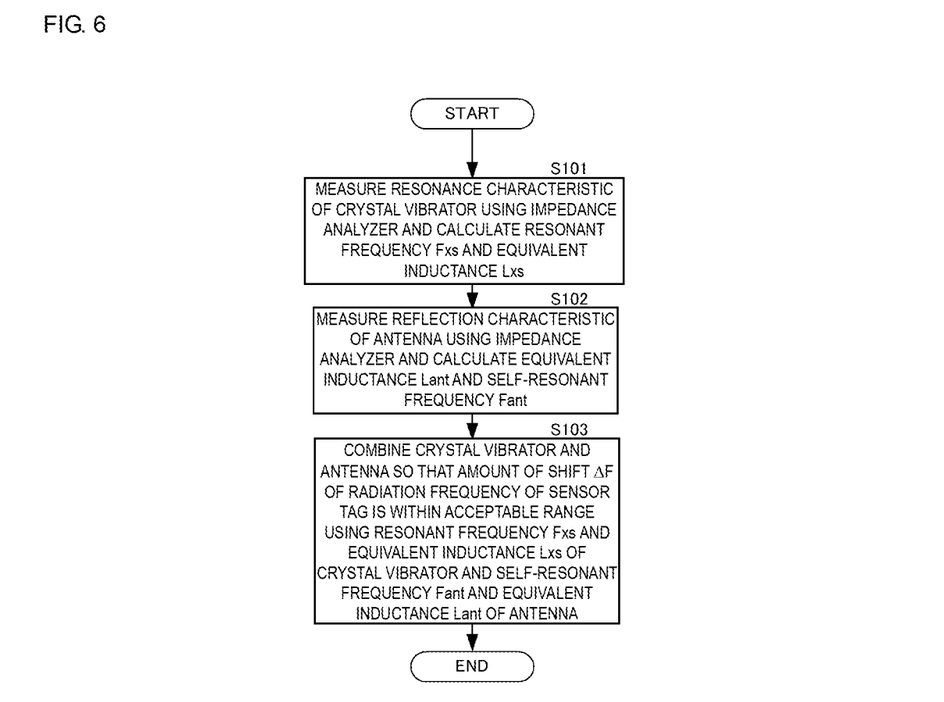
FIG. 6 is a flowchart illustrating the steps of manufacturing the sensor tag of this embodiment.
Figure 7:
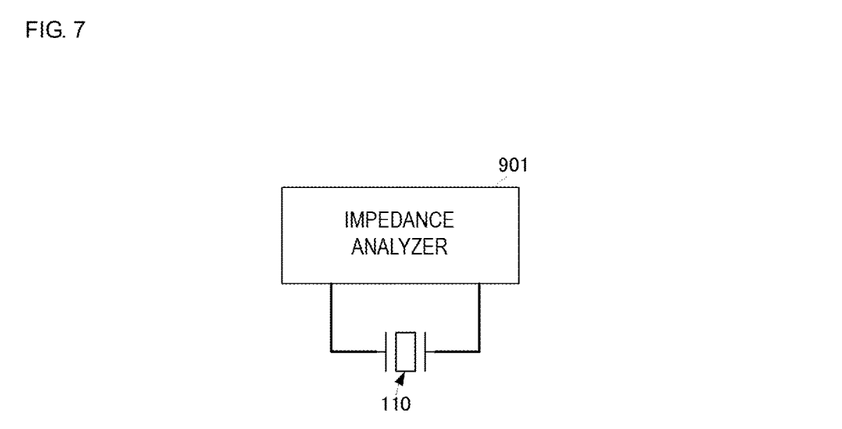
FIG. 7 illustrates a measurement method for a crystal vibrator.
Figure 8:
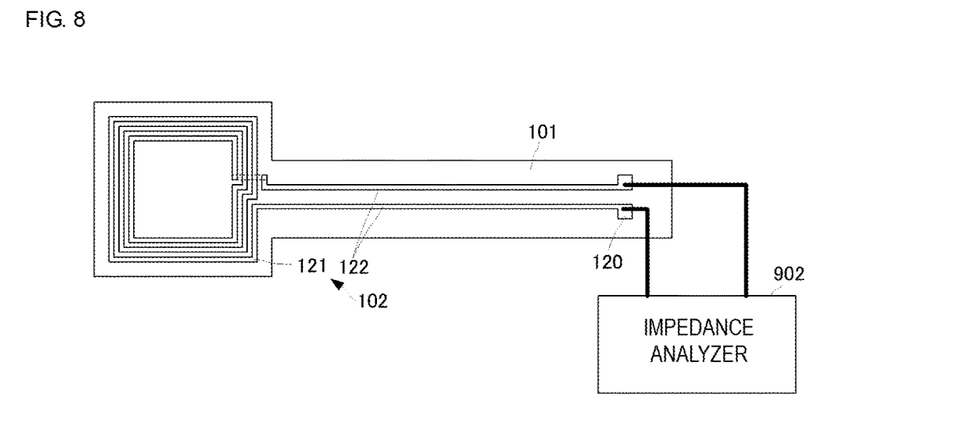
FIG. 8 illustrates a measurement method for an antenna.

Such a sensor tag is manufactured as described below. FIG. 6 is a flowchart illustrating the steps of manufacturing the sensor tag of this embodiment. FIG. 7 illustrates a measurement method for a crystal vibrator. FIG. 8 illustrates a measurement method for an antenna.

First, as illustrated in FIG. 7, the crystal vibrator 110 is connected to an impedance analyzer 901 in a standalone state. A resonance characteristic of the crystal vibrator 110 is measured using the impedance analyzer 901. Equivalent circuit constants such as the resonant frequency Fxs, the equivalent inductance Lxs, the equivalent capacitances Cxs and Cxp and the equivalent resistance Rxs are calculated from the measured resonance characteristic (S101).

Next, as illustrated in FIG. 8, an impedance analyzer 902 is connected to the land conductors 120 of the antenna 102 without the crystal vibrator 110 being mounted. A reflection characteristic of the antenna 102 is measured with the impedance analyzer 902 (S102). The reflection characteristic may be measured at a certain frequency, for example, at 1 MHz.

Next, the antenna 102 is connected to the crystal vibrator 110 such that the amount of shift ΔF of the radiation frequency of the sensor tag 10 falls within the acceptable range in accordance with the resonant frequency Fxs and equivalent inductance Lxs of the crystal vibrator 110 and the self-resonant frequency Fant and the equivalent inductance Lant of the antenna 102 (S103). As a method of connecting the antenna, for example, a plurality of antennas 102 are prepared with different values of self-resonant frequency Fant and equivalent inductance Lant as parameters. Then, an antenna is selected such that the amount of shift ΔF of the radiation frequency of the sensor tag 10 falls within the acceptable range in accordance with the resonant frequency Fxs and the equivalent inductance Lxs of the crystal vibrator 110 and the antenna is connected to the crystal vibrator 110.

By using this manufacturing method, it is possible to manufacture with certainty the sensor tag 10 having a radiation frequency F that lies within the acceptable frequency range even when the equivalent inductance of the antenna 102 changes due to for example the deformation of the antenna 102.

Next, a sensor tag according to a second embodiment of the present disclosure will be described with reference to the drawings. In the above-described first embodiment, a method of setting the antenna 102 using conditions of 0<frF<1 and frL<1 was described, whereas in this embodiment, a method of setting the antenna 102 using a condition of frF>1 will be described.

Figure 9:
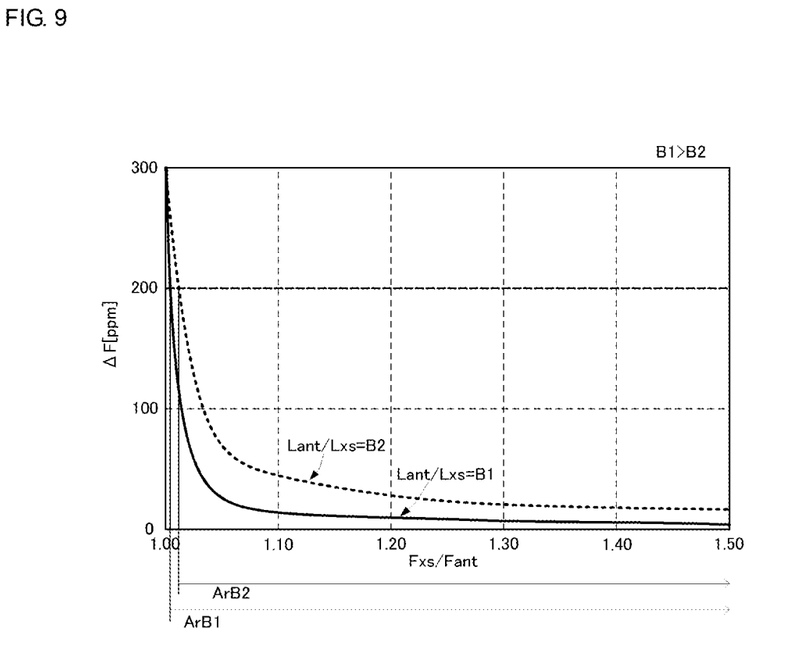
FIG. 9 is a graph illustrating a concept of determining an antenna according to a second embodiment of the present disclosure.
Figure 10:
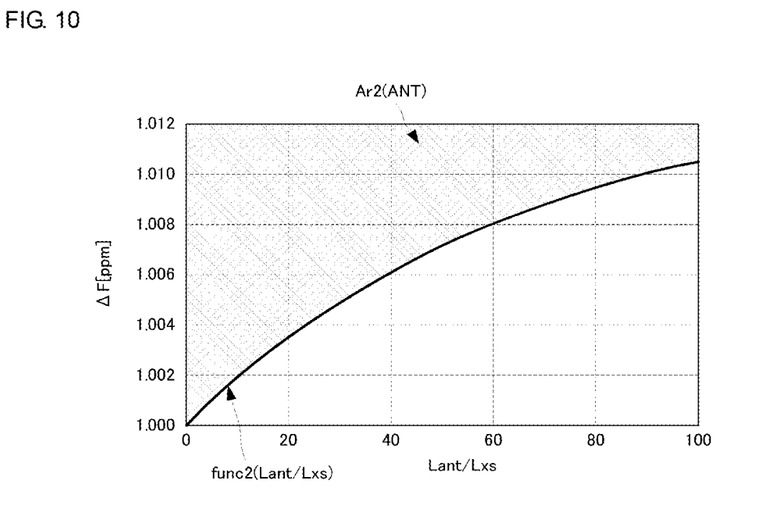
FIG. 10 is a graph illustrating a concept of determining an antenna according to the second embodiment of the present disclosure.

FIGS. 9 and 10 are graphs illustrating a concept of determining an antenna according to the second embodiment of the present disclosure. FIG. 9 is a graph illustrating the results of a simulation of what effect a resonant frequency ratio, which is a ratio between the resonant frequency Fxs of the crystal vibrator and the self-resonant frequency Fant of the antenna, and an inductance ratio, which is a ratio of the equivalent inductance Lxs of the crystal vibrator and the equivalent inductance Lant of the antenna, have on a radiation frequency F. In FIG. 9, the horizontal axis represents the resonant frequency ratio and the vertical axis represents an amount of shift ΔF of the radiation frequency F. In addition, the characteristic curves in FIG. 9 each represent the case of a different inductance ratio. FIG. 10 is a graph illustrating the relationship between the resonant frequency ratio and the inductance ratio. In FIG. 10, the horizontal axis represents the inductance ratio and the vertical axis represents the resonant frequency ratio.

The resonant frequency ratio in FIGS. 9 and 10 is a ratio obtained by taking the resonant frequency Fxs of the crystal vibrator 110 by itself as the numerator and the resonant frequency Fant of the antenna 102 by itself as the denominator. The inductance ratio in FIGS. 9 and 10 is a ratio obtained by taking the equivalent inductance Lant of the antenna 102 as the numerator and the equivalent inductance Lxs of the crystal vibrator 110 as the denominator. In FIGS. 9 and 10, Lant/Lxs is actually (Lant/Lxs)×10⁶.

The amount of shift ΔF in FIG. 9 is expressed by ΔF=F1c−F1t, where F1t is the radiation frequency in a normal state where the antenna is not bent and F1c is the radiation frequency in a state where the antenna is bent. In this simulation, the resonant frequency Fxs and the equivalent inductance Lxs of the crystal vibrator 110 are those for a case where the simulation is performed at a temperature of 38.75° C. This temperature may be set on the basis of a temperature range to be measured by the sensor tag 10 and may be set to a temperature in the center of this range for example.

As illustrated in FIG. 9, even under a condition of frF>1, the amount of shift ΔF increases as a resonant frequency ratio frF (=Fxs/Fant) approaches 1.0 when an inductance ratio frL (=Lant/Lxs) is fixed. That is, the closer the resonant frequency Fxs of the crystal vibrator 110 and the self-resonant frequency Fant of the antenna come to having the same value, the more liable the amount of shift ΔF is to increase.

In addition, under the condition of frF>1, when the resonant frequency ratio frF is fixed, the smaller the inductance ratio frL becomes, the larger the amount of shift ΔF becomes. That is, as the equivalent inductance Lant of the antenna 102 moves away from the equivalent inductance Lxs of the crystal vibrator 110, the more liable the amount of shift ΔF is to increase. As illustrated in FIG. 9, this phenomenon occurs with the same trend regardless of the resonant frequency ratio.

Therefore, as the inductance ratio frL becomes smaller, an acceptable range Ar of the resonant frequency ratio equal to or less than a certain amount of shift ΔF becomes narrower. For example, as illustrated in FIG. 9, the acceptable value of ΔF is 200 ppm, the inductance ratio frL is set to two values B1 and B2, and B1>B2. If the respective acceptable ranges of the resonant frequency ratio frF are ArB1 and ArB2 in these cases, ArB1>ArB2.

If we make the relationship between the resonant frequency ratio frF and the inductance ratio frL determining the acceptable range into a function, the following expression is obtained under conditions of frF>1 and frL>0.

$$frF = 1 - k1'^* frL^2 + k2'^* frL \quad \text{(Equation 3')}$$

When this equation is represented as a graph, the thick line in FIG. 10 is obtained.

Points lying along the function represent cases where the amount of shift ΔF has a threshold acceptable value. Therefore, when the resonant frequency ratio frF is fixed, the amount of shift ΔF is less than the threshold acceptable value when the inductance ratio is larger than the inductance ratio frL calculated from (Equation 3'). In addition, when the inductance ratio frL is fixed, the amount of shift ΔF is less than the threshold acceptable value when the resonant frequency ratio is larger than the resonant frequency ratio frF calculated from (Equation 3'). That is, the resonant frequency ratio frF and the inductance ratio frL may be determined so as to be at a position on the origin side of the function of (Equation 3') in the graph of FIG. 10. The shape of the antenna 102 may be determined using the determined resonant frequency ratio and inductance ratio frL. The shape of the antenna 102 may be determined using the shape of the radiating conductor 121, the shape of the connection conductors 122 and the position at which the crystal vibrator 110 is connected to the connection conductors 122 and so forth. The shape of the radiating conductor 121 is determined by the number of turns, the central opening width (diameter), the conductor width and the conductor spacing. The shape of the connection conductors 122 is determined by the width and the spacing of the long conductors.

By determining the shape of the antenna 102 in this way, the radiation frequency F of the sensor tag 10 can be kept within a preset range of acceptable frequencies even when the equivalent inductance of the antenna 102 changes due to for example the deformation of the antenna 102.

It is possible to design the shape of the antenna 102 corresponding to a threshold acceptable value of the amount of shift ΔF by changing the coefficients of (Equation 3).

Here, a number of specific setting examples will be described. The following setting examples illustrate a case in which a Ys cut crystal vibrator 110 has a resonant frequency of 26 MHz. The Ys cut crystal is useful since it is possible to perform a high-resolution temperature measurement with a characteristic of 100 ppm/° C. In addition, the inductance of the antenna 102 is thought to change by −20% when the antenna 102 is bent.

(A) When the acceptable temperature error range is ±2.5° C., the acceptable range of the amount of shift ΔF is ±250 ppm. In this case, the coefficients of (Equation 3') may be set as follows.

$$k1' \approx 2.9 \times 10^{-7}$$

$$k2' \approx 6.0 \times 10^{-5}$$

(B) When the acceptable temperature error range is ±1.5° C., the acceptable range of the amount of shift ΔF is ±150 ppm. In this case, the coefficients of (Equation 3') may be set as follows.

$$k1' \approx 4.3 \times 10^{-7}$$

$$k2' \approx 1.0 \times 10^{-4}$$

(C) When the acceptable temperature error range is ±1.0° C., the acceptable range of the amount of shift ΔF is ±100 ppm. In this case, the coefficients of (Equation 3') may be set as follows.

$$k1' \approx 6.6 \times 10^{-7}$$

$$k2' \approx 1.7 \times 10^{-4}$$

(D) When the acceptable temperature error range is ±0.5° C., the acceptable range of the amount of shift ΔF is ±50 ppm. In this case, the coefficients of (Equation 3') may be set as follows.

$$k1' \approx 9.0 \times 10^{-7}$$

$$k2' \approx 3.2 \times 10^{-4}$$

(E) When the acceptable temperature error range is ±0.2° C., the acceptable range of the amount of shift ΔF is ±20 ppm. In this case, the coefficients of (Equation 3) may be set as follows.

$$k1 \approx 2.8 \times 10^{-6}$$

$$k2 \approx 9.0 \times 10^{-4}$$

In each of the above-described embodiments, an example is described in which the range over which the radiation frequency F of the sensor tag 10 changes as a result of a change in inductance due to the deformation of the antenna 102 is restricted. However, by also applying the above-described configuration and method to a case where the inductance changes due to variations in the dimensions of the antenna 102 (manufacturing variations), the range over which the radiation frequency F of the sensor tag 10 changes can be restricted similarly to as in the above-described embodiments.

In addition, the resonant frequency Fxs of the crystal vibrator 110 is determined by the equivalent inductance Lxs and the equivalent capacitance Cxs as illustrated in the above (Equation 1). Accordingly, even if the resonant frequency Fxs is the same, the equivalent inductance Lxs and the equivalent capacitance Cxs may have different values. That is, even if the resonant frequency Fxs is the same, the equivalent inductance Lxs and the equivalent capacitance Cxs may vary individually. In such a case as well, the radiation frequency F of a sensor tag 10 changes similarly to as when the antenna 102 deforms as described above.

Here, the resonant frequency Fxs and the equivalent inductance Lxs of the crystal vibrator 110 can be determined in advance on the basis of the operational frequency band and the shape of the crystal vibrator. Therefore, by applying the above-described configuration and method in order to set the equivalent inductance Lant of the antenna 102, the range over which the radiation frequency F of the sensor tag 10 changes can be restricted similarly to as in the above-described embodiments. That is, the radiation frequency F of the sensor tag 10 can be made to fall within a desired frequency range without being affected by variations in the equivalent inductance Lxs and the equivalent capacitance Cxs of the crystal vibrator 110.

Figure 11:
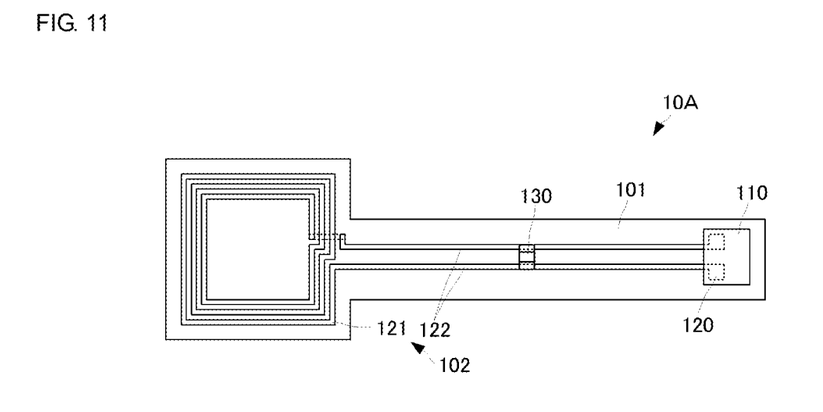
FIG. 11 is a plan view illustrating the configuration of a sensor tag to which an impedance adjusting element has been added.

In addition, although an example is described in each of the above-described embodiments in which the range over which the radiation frequency F of the sensor tag 10 changes is restricted by changing the shape of the antenna 102, for example, the following configuration may be adopted in a case where the range over which the radiation frequency F of the sensor tag 10 changes cannot be restricted by only changing the shape of the antenna 102. FIG. 11 is a plan view illustrating the configuration of a sensor tag to which an impedance adjusting element has been added.

The sensor tag 10A has a configuration obtained by adding an impedance adjusting element 130 to the above-described sensor tag 10. The impedance adjusting element 130 is composed of a mount-type inductor or capacitor. The impedance adjusting element 130 is connected to the connection conductors 122. More specifically, one outer electrode of the impedance adjusting element 130 is connected to one of the two connection conductors 122 and the other outer electrode of the impedance adjusting element 130 is connected to the other of the two connection conductors 122.

With this configuration as well, the range over which the radiation frequency F of the sensor tag 10 changes can be restricted. In addition, with the configuration of the sensor tag 10A, the range over which the radiation frequency F of the sensor tag 10A changes can also be restricted in a case where the range over which the radiation frequency F changes cannot be adjusted by only changing the shape of the antenna 102.

10, 10A: sensor tag,
101: flexible substrate,
102: antenna,
110: crystal vibrator,
120: land conductor,
121: radiating conductor,
122: connection conductor,
130: impedance adjusting element,
901: impedance analyzer,
902: network analyzer

The invention claimed is:

1. A sensor tag comprising:
   a resonator having a resonant frequency corresponding to a sensed physical quantity; and
   an antenna that radiates a signal generated by resonance of the resonator to the outside;
   wherein the antenna is formed such that a resonant frequency ratio between the resonant frequency of the resonator and a self-resonant frequency of the antenna falls within a ratio range, the ratio range being selected based on an inductance ratio between an equivalent inductance of the resonator and an equivalent inductance of the antenna.

2. The sensor tag according to claim 1,
   wherein the resonant frequency ratio is expressed by a function of the inductance ratio, and
   the antenna is formed such that the resonant frequency ratio is equal to or less than a value obtained by inputting the inductance ratio into the function.

3. The sensor tag according to claim 1,
   wherein the resonant frequency ratio is expressed by a function of the inductance ratio, and
   the antenna is formed such that the resonant frequency ratio is equal to or more than a value obtained by inputting the inductance ratio into the function.

4. The sensor tag according to claim 2,
   wherein the function is expressed by a quadratic function of the inductance ratio.

5. The sensor tag according to claim 2,
   wherein a coefficient of the function is determined on the basis of an acceptable range of frequency shifting.

6. The sensor tag according to claim 1,
   wherein the antenna includes a radiating conductor and a connection conductor connecting the radiating conductor and the resonator, and
   a shape of the antenna is determined by a shape of the radiating conductor or the connection conductor.

7. The sensor tag according to claim 1,
   wherein the resonator is a crystal vibrator.

8. A manufacturing method for a sensor tag including a resonator having a resonant frequency corresponding to a sensed physical quantity and an antenna that radiates a signal generated by resonance of the resonator to the outside, the manufacturing method comprising:
   a step of preparing a plurality of antennas;
   a step of measuring a self-resonant frequency and an equivalent inductance of each of the antennas;
   a step of measuring a resonant frequency and an equivalent inductance of a crystal vibrator; and
   a step of connecting one of the antennas to the crystal vibrator, the antenna being selected from the plurality of antennas such that a resonant frequency ratio between the resonant frequency of the resonator and the self-resonant frequency of the antenna falls within a ratio range, the ratio range being selected based on an inductance ratio between the equivalent inductance of the resonator and the equivalent inductance of the antenna.

9. The sensor tag according to claim 3,
   wherein the function is expressed by a quadratic function of the inductance ratio.

10. The sensor tag according to claim 3,
    wherein a coefficient of the function is determined on the basis of an acceptable range of frequency shifting.

11. The sensor tag according to claim 4,
    wherein a coefficient of the function is determined on the basis of an acceptable range of frequency shifting.

12. The sensor tag according to claim 2,
    wherein the antenna includes a radiating conductor and a connection conductor connecting the radiating conductor and the resonator, and
    a shape of the antenna is determined by a shape of the radiating conductor or the connection conductor.

13. The sensor tag according to claim 3,
wherein the antenna includes a radiating conductor and a connection conductor connecting the radiating conductor and the resonator, and
a shape of the antenna is determined by a shape of the radiating conductor or the connection conductor.

14. The sensor tag according to claim 4,
wherein the antenna includes a radiating conductor and a connection conductor connecting the radiating conductor and the resonator, and
a shape of the antenna is determined by a shape of the radiating conductor or the connection conductor.

15. The sensor tag according to claim 5,
wherein the antenna includes a radiating conductor and a connection conductor connecting the radiating conductor and the resonator, and
a shape of the antenna is determined by a shape of the radiating conductor or the connection conductor.

16. The sensor tag according to claim 2,
wherein the resonator is a crystal vibrator.

17. The sensor tag according to claim 3,
wherein the resonator is a crystal vibrator.

18. The sensor tag according to claim 4,
wherein the resonator is a crystal vibrator.

19. The sensor tag according to claim 5,
wherein the resonator is a crystal vibrator.

20. The sensor tag according to claim 6,
wherein the resonator is a crystal vibrator.

* * * * *